United States Patent [19]

Eikeland

[11] Patent Number: 5,828,837
[45] Date of Patent: Oct. 27, 1998

[54] COMPUTER NETWORK SYSTEM AND METHOD FOR EFFICIENT INFORMATION TRANSFER

[75] Inventor: Martin Eikeland, Bekkestua, Norway

[73] Assignee: Digilog AS, Bekkestua, Norway

[21] Appl. No.: 632,102

[22] Filed: Apr. 15, 1996

[51] Int. Cl.$^6$ .................................................. G06F 15/16
[52] U.S. Cl. ........................ 395/200.32; 395/200.47; 395/200.63; 395/200.54; 395/200.62
[58] Field of Search ..................... 395/200.06, 200.09, 395/200.11, 200.13, 200.47, 200.48, 200.49, 200.53, 200.54, 200.55, 200.61, 200.62, 200.63, 200.64, 200.65, 200.32; 370/230, 232, 235, 233, 234; 707/10

[56] References Cited

U.S. PATENT DOCUMENTS

| | | | |
|---|---|---|---|
| 4,991,172 | 2/1991 | Cidon et al. | 370/400 |
| 5,193,151 | 3/1993 | Jain | 395/200.67 |
| 5,329,619 | 7/1994 | Pagé et al. | 395/200.33 |
| 5,347,632 | 9/1994 | Filepp et al. | 707/200.32 |
| 5,404,505 | 4/1995 | Levinson | 707/10 |
| 5,500,890 | 3/1996 | Rogge et al. | 379/91.02 |
| 5,504,744 | 4/1996 | Adams et al. | 370/232 |
| 5,519,689 | 5/1996 | Kim | 370/232 |
| 5,528,501 | 6/1996 | Hanson | 364/443 |
| 5,572,643 | 11/1996 | Judson | 395/200.48 |
| 5,610,910 | 3/1997 | Focsaneanu et al. | 370/351 |
| 5,617,565 | 4/1997 | Augenbraun et al. | 707/4 |
| 5,694,594 | 12/1997 | Chang | 395/606 |
| 5,710,884 | 1/1998 | Dedrick | 395/200.47 |

FOREIGN PATENT DOCUMENTS

| | | |
|---|---|---|
| 0 384 339 A2 | 8/1990 | European Pat. Off. |
| 0 570 683 A2 | 11/1993 | European Pat. Off. |
| 0582537 A2 | 2/1994 | European Pat. Off. |
| 0 632 672 A2 | 1/1995 | European Pat. Off. |
| WO 97/39548 | 10/1997 | WIPO |

OTHER PUBLICATIONS

Wakeman, I. et al., "Implementing Real Time Packet Forwarding Policies Using Streams", Processing of the 1995 USENIX Technical Conference, Jan. 16–20, 1995 — New Orleans, LA. USA, pp. 71–82.

Khayata, R. et al., "A Distributed Medium Access Protocol For Wireless LANs," Record of the Asilomar Conference on Signals, vol. 1, No. Conf. 28 1995 IEEE, pp. 238–242.

PCT Search Report for International Application No. PCT/NO97/00096, Oct. 1997.

Kohda, Youji et al. "Ubiquitous Advertising on the WWW: Merging Advertisement on the Browser", Computer Networks and ISDN Systems, vol. 28, pp. 1493–1499, 1996.

*Primary Examiner*—Tod R. Swann
*Assistant Examiner*—Conley B. King, Jr.
*Attorney, Agent, or Firm*—Finnegan, Henderson Farabow, Garrett and Dunner, L.L.P.

[57] ABSTRACT

A computer network connects information providers and end-users of network services, facilitates direct information to users, and gathers user responses. The computer network is designed to use otherwise idle bandwidth of the network transmission medium to transfer targeted commercial and non-commercial information to users while minimizing the delay of normal network traffic. User reports containing demographics and user responses is generated ensuring user privacy. Information providers can access the user report without violating user anonymity.

55 Claims, 9 Drawing Sheets

5,828,837

COMPUTER NETWORK SYSTEM AND METHOD FOR EFFICIENT INFORMATION TRANSFER

BACKGROUND OF THE INVENTION

The present invention relates generally to computer networks that connect information providers and end-users of network services. More particularly, the present invention relates to a computer network for providing directed information to users and gathering user reports.

A user often connects to a network service to view or download information from a wide array of resources. Network services include various networks, e.g., Internet, or other online services, e.g., AMERICA ONLINE, COMPUSERVE, DIALOG, GENIE, and PRODIGY. When a user selects desired information from such a service, the service transmits the selected information to the user over a network transmission medium in packets. The transmission capacity of a network is measured in bandwidth and information packets are transmitted over available bandwidth using TCP/IP (Transmission Control Protocol/Internet Protocol). Currently, network service users have exclusive control over selecting information for viewing or downloading.

This type of system has many disadvantages, however. First, the network service user greatly underutilizes the available bandwidth. For example, no use is made of free space between information packets transmitted over an active transmission medium. Additionally, the entire bandwidth of an idle link is wasted when the user does not request information transfer.

In addition to the significant underutilization of the bandwidth, one-sided control of information transfer by the user is undesirable from the perspective of both users and information providers such as commercial or non-commercial entities that furnishes information to users through network services. The Internet offers a vast amount of information and continues to expand with tremendous speed, making it extremely difficult for any one user to maintain a comprehensive knowledge of all available information and resources and keep current with the changes and additions to the Internet resources. Most often, a user accesses only a small portion of the available information and a user's breadth of access depends significantly on the user's current knowledge of the available resources. Therefore, the user receives only a part of the benefit the Internet can provide.

One-sided user control further restricts on information providers from offering better services. Currently, information providers cannot furnish information directly to a specific group of users. Only users who know of and make an effort to access the specific information receive that information. Moreover, information providers only transmit information to specific users by e-mail (electronic mail). Mass e-mail, however, is not specifically targeted to a particular audience, and many users find mass e-mail irrelevant or uninteresting and quickly discard it as "junk mail."

Additionally, information providers often cannot gather information about the users' access to its products, such as what content they view, when they view it, how often they view it, and how long they view it. Information providers also may not know its number of users or their demographics. For example, although it is possible to record how many times an Internet site has been accessed, that record does not demonstrate whether the user actually views the information. Good statistical information data can help information providers assess user interests, and thereby improve and better tailor the information to user interest.

Therefore, it is desirable to maximize the use of network bandwidth by delivering information targeted specifically to a user's interests and hobbies during times when the network is not otherwise engaged. For example, it is desirable to transmit information to users during idle times. It is also desirable to transmit targeted information to the user by utilizing otherwise idle bandwidth and thus minimizing additional delay to normal network traffic.

In addition, it is desirable to gather information about the users without invading user privacy.

It is further desirable to generate a report of user responses for information providers with accurate assessment of user demand to create a more attractive and dynamic network service environment.

SUMMARY OF THE INVENTION

Accordingly, the present invention is directed to a computer network that substantially obviates one or more of the problems due to limitations and disadvantages of the related art.

In accordance with the purpose of the present invention, as embodied and broadly described, the invention provides a computer network for connecting information providers and users through a network service provider comprising a user node, a master database, a network service provider, a master node, and a master program module. The user node includes means for sending a user id, means for receiving and displaying target information, means for receiving user request for certain user-selected information, and means for compiling and transmitting a user report identifying the displayed target information and user-selected information. The master node is coupled to the user node over a transmission medium capable of supporting communications between the master node and the user node. The master node includes means for receiving the user id and the respective network address from the network service provider, means for monitoring the traffic on the transmission medium between the user node and the master node, and means for transferring information to the user node without causing additional communication delay between the master node and the user node. The master program module is coupled to the master node and the master database, and includes means for receiving the user id and respective network address from the master node, means for accessing user profile information corresponding to the user id, means for transmitting to the user node, through the master node, a reference to target information corresponding to the accessed user profile, and means for storing the user report from the user node.

According to another aspect of the present invention, a method for connecting information providers and users comprises several steps. A user node sends a user id corresponding to a current user of the user node to a network service provider. The network service provider sends the user id and the respective network address to the master program module. The master program module accesses user profile information corresponding to the user id, and transmits a reference to target information to the user node. The user node receives the reference to the target information, and requests a transfer of target information from a master node. The master node transfers the requested target information to the user node while minimizing additional communication delay between the master node and the user node. The user node displays the transferred information and receives requests for certain user-selected information from the current user. The user node also compiles and transmits a user report identifying the displayed target information and user-selected information. Finally, the master program module stores the user report from the user node.

BRIEF DESCRIPTION OF THE DRAWINGS

The accompanying drawings, which are incorporated in and constitute a part of this specification, illustrate the invention and together with the description, serve to explain the principles of the invention.

In the drawings.

DESCRIPTION OF THE PREFERRED EMBODIMENT

Figure 1:
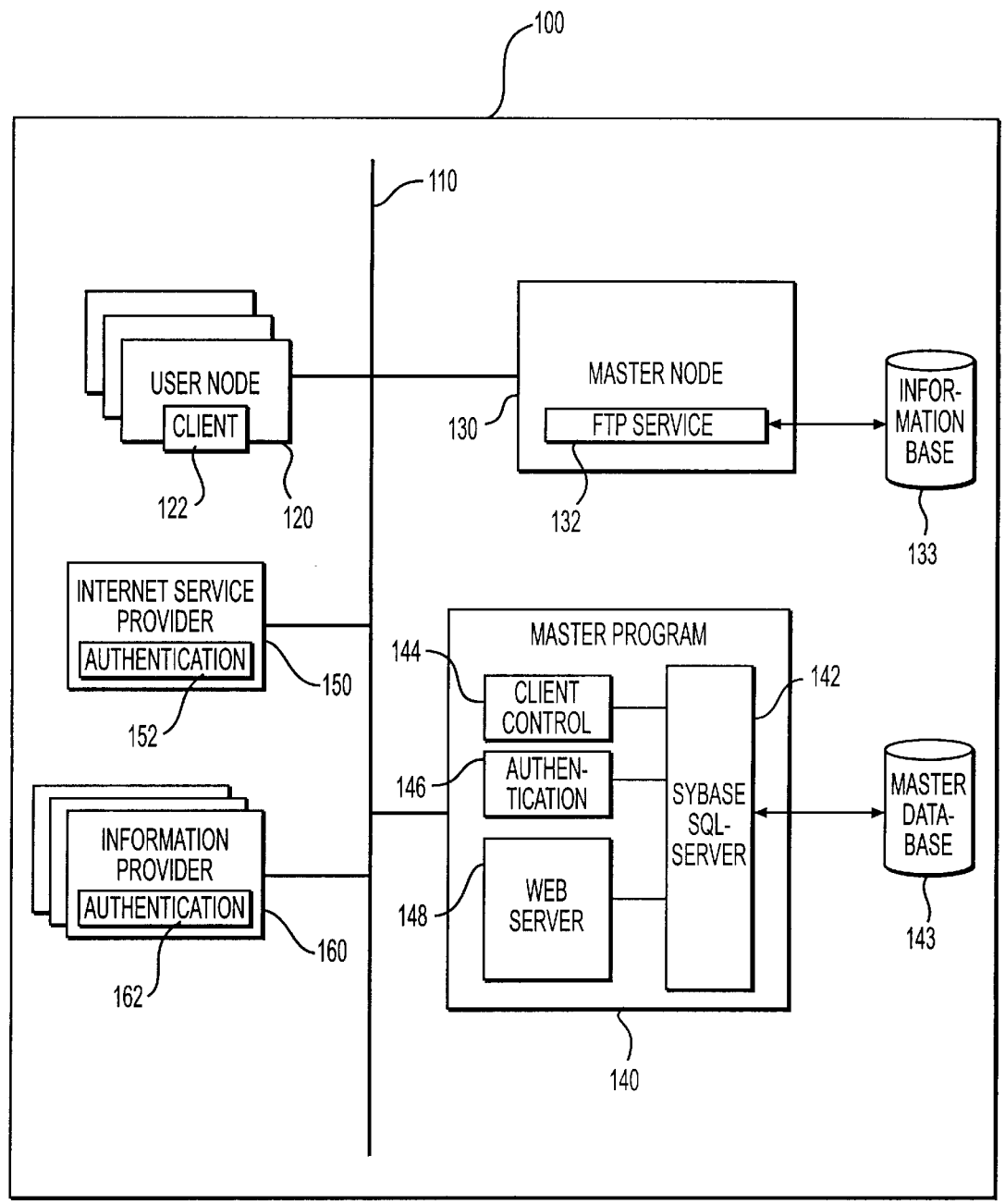
FIG. 1 is a block diagram of a preferred embodiment of the computer network according to the present invention.

FIG. 1 shows a computer network 100 according to the present invention. Various hardware and software components of computer network 100 are connected by transmission medium 110. A user node 120 is typically a personal computer, and Client 122 is a program resident on user node 120 to control network information transfer.

A master node 130 is preferably a server which has a special FTP (File Transfer Protocol) service 132 that transfers information to the user in conjunction with the Client 122. Preferably, service 132 includes FTP software that provides the necessary mechanism to minimize interference with network traffic. Special FTP service 132 also accesses information base 133 containing referenced information items.

Master program 140 is a large server preferably built on a Sybase SQL-Server platform 142, but one of ordinary skill can easily substitute the Sybase SQL-Server with other similar database technology. Sybase SQL-Server platform 142 accesses a master database 143, which contains user information including user profile information and target information references. A Client control program 144 interacts with Client 122 on user node 120. An authentication program 146 monitors network access, and a web server 148 provides a home page for user registration, information, and maintenance.

Internet service provider (ISP) 150 can be any of the aforementioned online service providers. ISP 150 also preferably includes an authentication program 152 to monitor user access. Information providers 160, containing an authentication program 162 to monitor network access, may include a wide array of commercial and non-commercial entities desiring to furnish information on the network.

Figure 2:
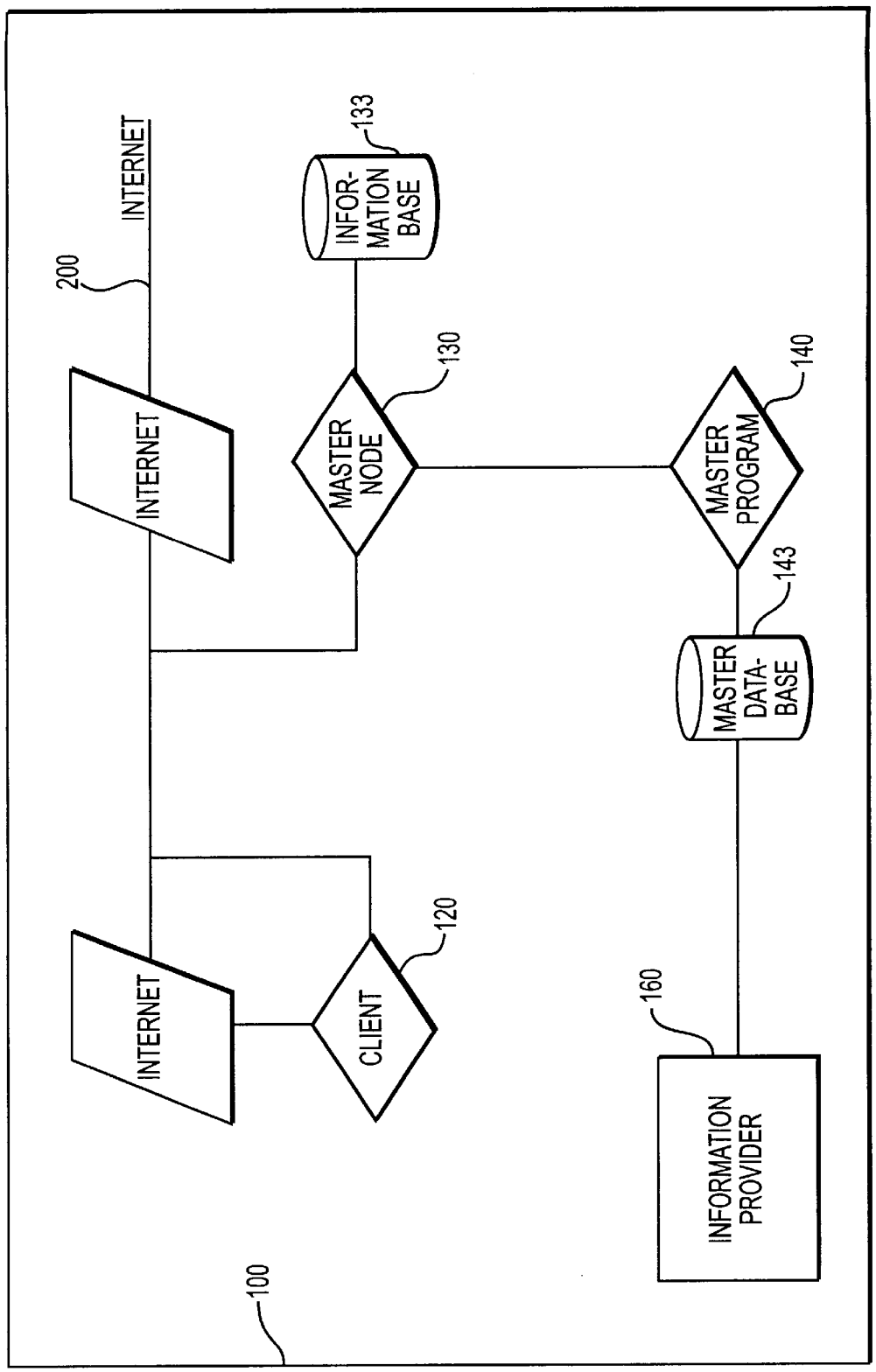
FIG. 2 is a functional representation of the computer network shown in FIG. 1.

FIG. 2 is a functional representation of the computer network 100 shown in FIG. 1. For convenience, Internet will be used as an exemplary network service.

Figure 3:
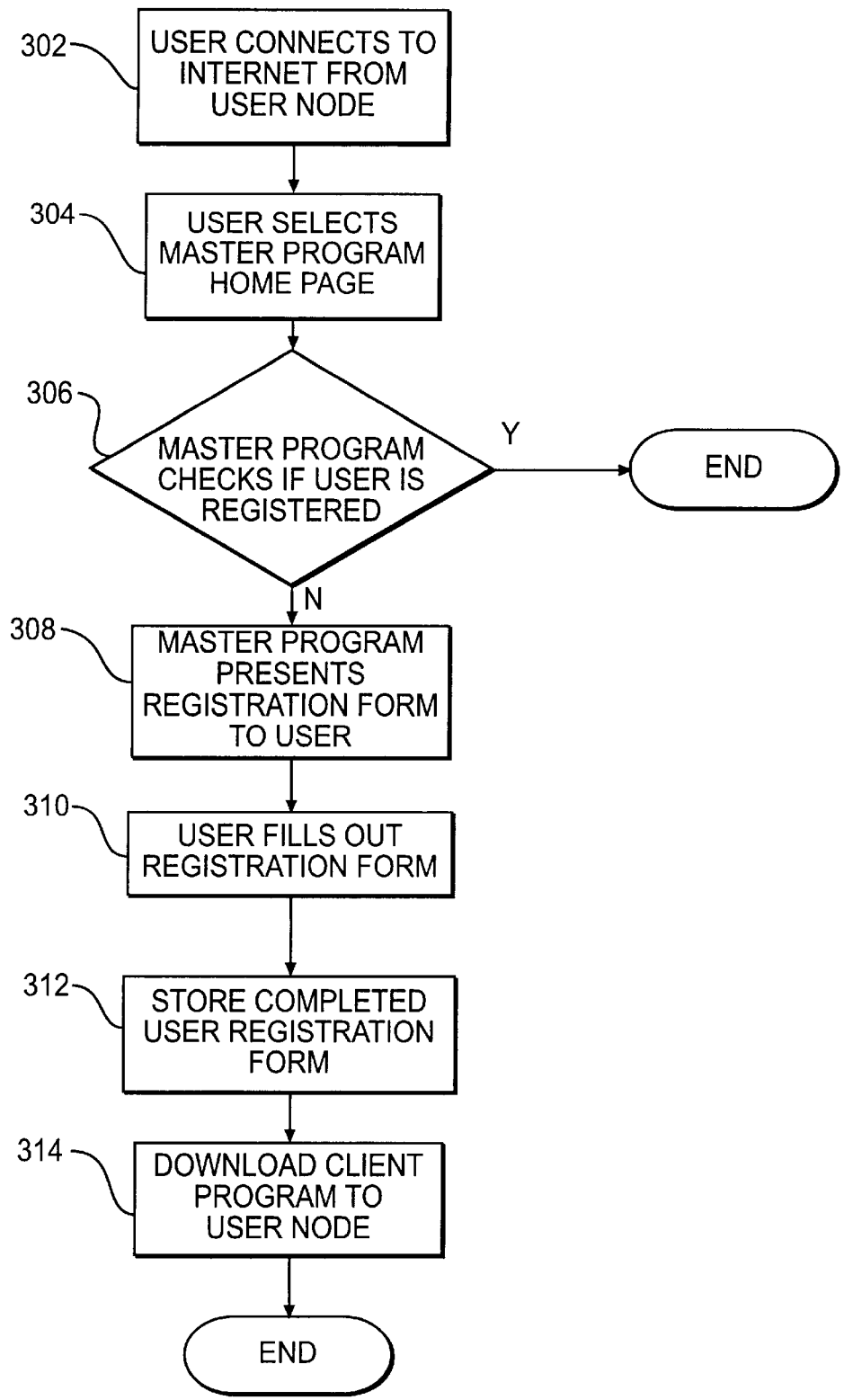
FIG. 3 is a flowchart of a user registration process according to a preferred implementation of this invention.

The first step in using network 100 is the user registration process, which will be explained with reference to FIG. 3. To start a network session, a user at user node 120 connects to the Internet 200 through ISP 150 (step 302). While "surfing" on the Internet 200, the user may select master program 140 home page (step 304). Upon selecting master program 140, authentication program 146 checks to see whether the user is registered in master program 140 (step 306).

If so, the authentication process completes successfully (step 307). The user is now on computer network 100.

If the user is not registered, master program 140 presents a registration form to user node 120 (step 308). The user then completes the registration form on screen by providing user profile information, such as user identification of ISP 150, characteristics, interests, and hobbies (step 310). User node 120 transmits the completed form to master program 140 which stores it in master database 143 (step 312).

Once master program 140 receives the completed form from user node 120, program 140 transmits a copy of Client 122 to user node 120 (step 314). This completes the user registration process.

On subsequent user connections to ISP 150, ISP 150 assigns a temporary network address to the respective user. Additionally, after Client 122 has been downloaded and is active on user node 120, authentication program 146 is not executed on subsequent user access to network 100.

Figure 4:
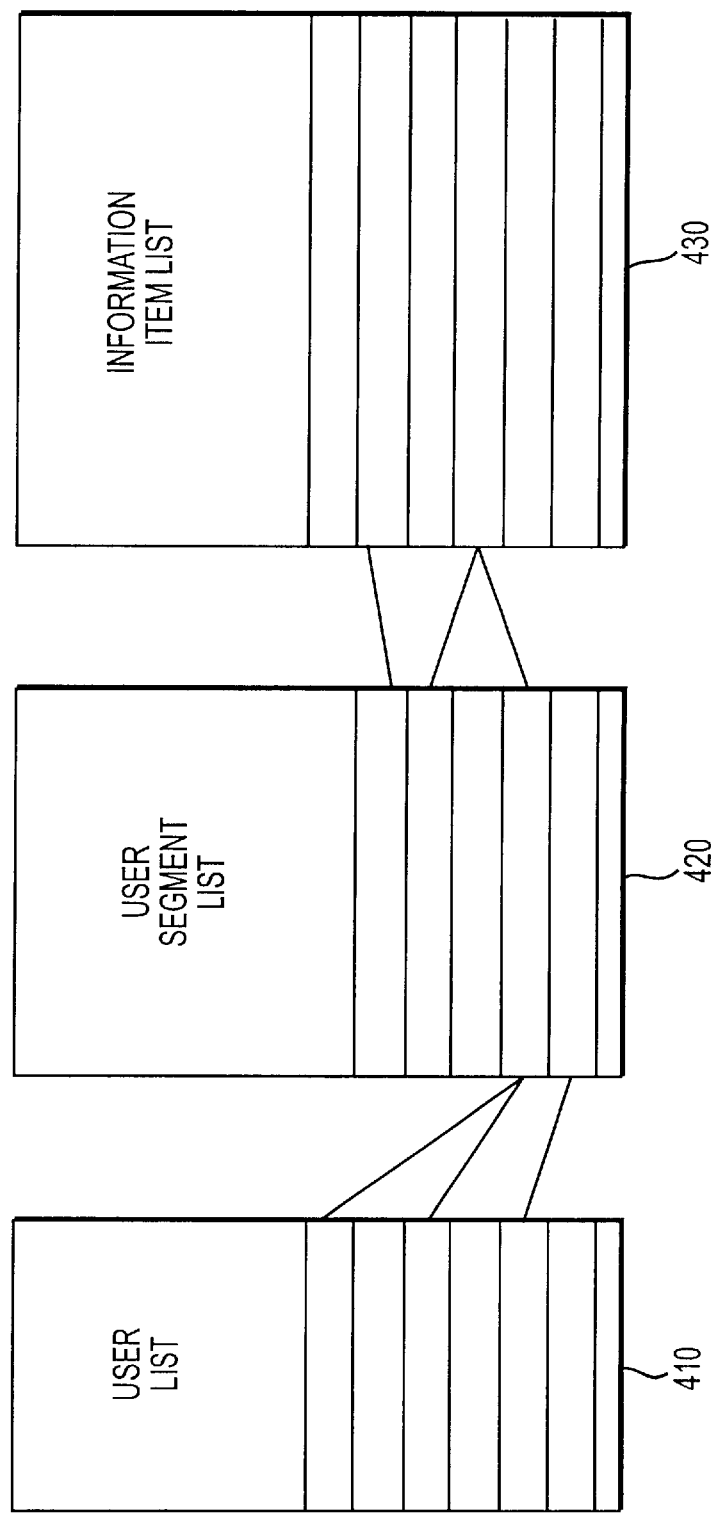
FIG. 4 a diagram illustrating several lists in the master database.

FIG. 4 shows three lists, i.e., user list 410, user segment list 420, and information item list 430. Registered users are compiled in user list 410. To ensure user privacy and anonymity, user list 410 preferably uses pseudo-identities for the user so that external sources, such as information providers, cannot access the user's true identity or user profile.

Each user of user lists 410 points to a particular segment of the user segment list 420 that best corresponds to the user profile. That pointing corresponds to the user profile information on the user registration form. Segments can include, for example, hobbies and interests. Each segment of user segment list 420 in turn points to a particular item on information item list 430 that represents the type of relevant target information to be sent to the user as described below. Master database 143 stores user profile references to the user segment list 420 and information item list 430.

Figure 5A:
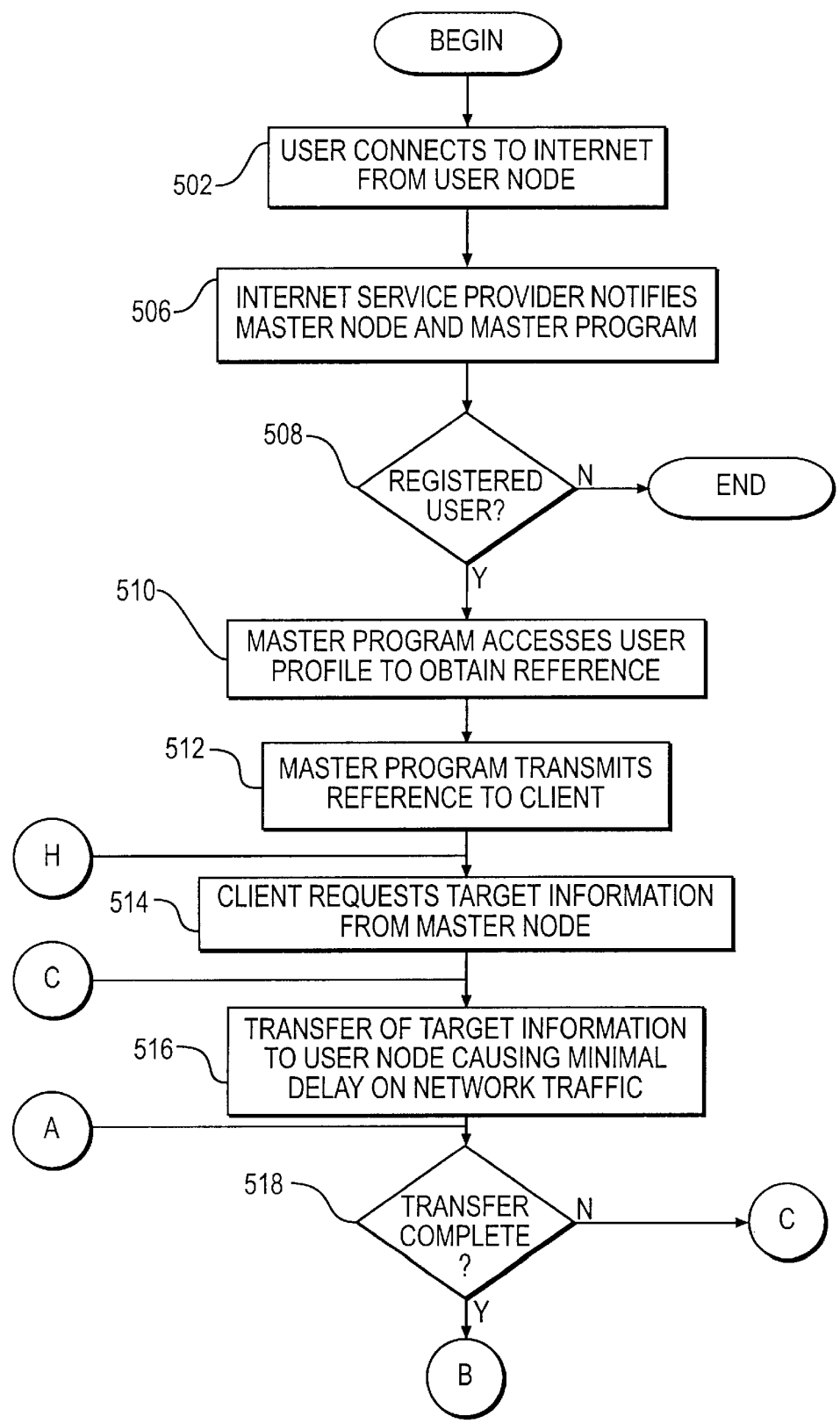
FIGS. 5A and 5B are flowcharts of the overall process of a computer network in FIG. 1.

FIG. 5A contains a flowchart showing the process of transmitting target information to the user using otherwise idle bandwidth. When a user connects to ISP 150 (step 502), ISP 150 notifies master program 140 of the user's identity and network address (step 506).

Authentication program 146 verifies whether the user is registered in master program 140 (step 508). If the user is registered, master program 140 accesses user profile information to identify the reference to the corresponding item of information item list 430 stored in master database 143 (step 510). Master program 140 transmits the identified reference to Client 122 of user node 120 (step 512) upon request from Client 122. This enables Client 122 to begin requesting target information stored in information base 133 corresponding to the referenced item of information item list 430 (step 514).

During the user's session on computer network 100, master node 130 automatically transfers the referenced target information in the background to Client 122 (step 516). The target information is transmitted in packets over a transmission medium until all packets are transferred (step 518).

To transfer target information causing little or no additional communication delay of non-target information between master node 130 and user node 120, master node 130 sends target information packets on an active link when non-target information packets are not being sent. If a link is completely idle, for example, when the user is not requesting any information, master node 130 sends target information packets over the idle link.

Figure 6:
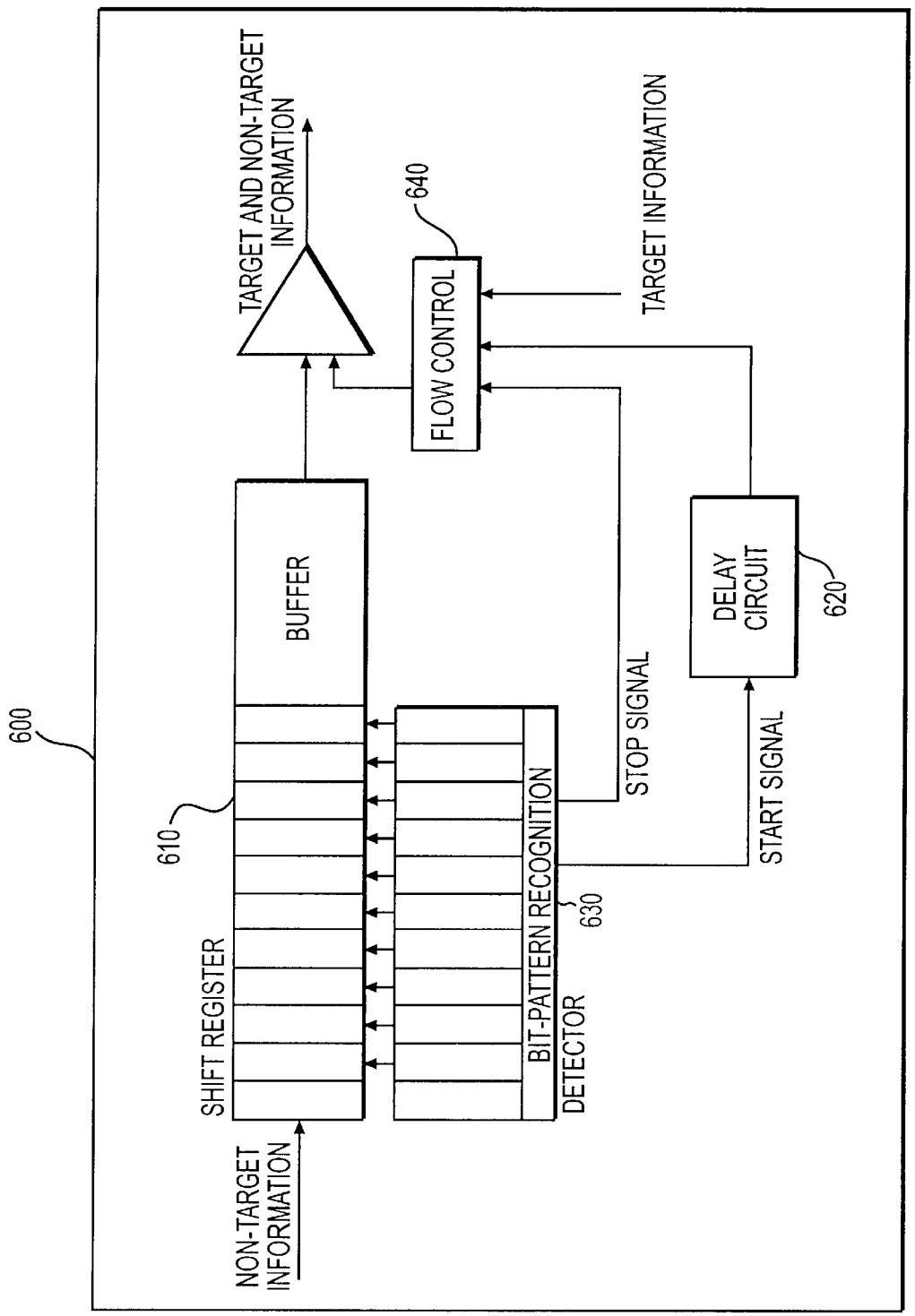
FIG. 6 is a schematic diagram of a network traffic monitor according to one embodiment of the present invention.
Figure 7:
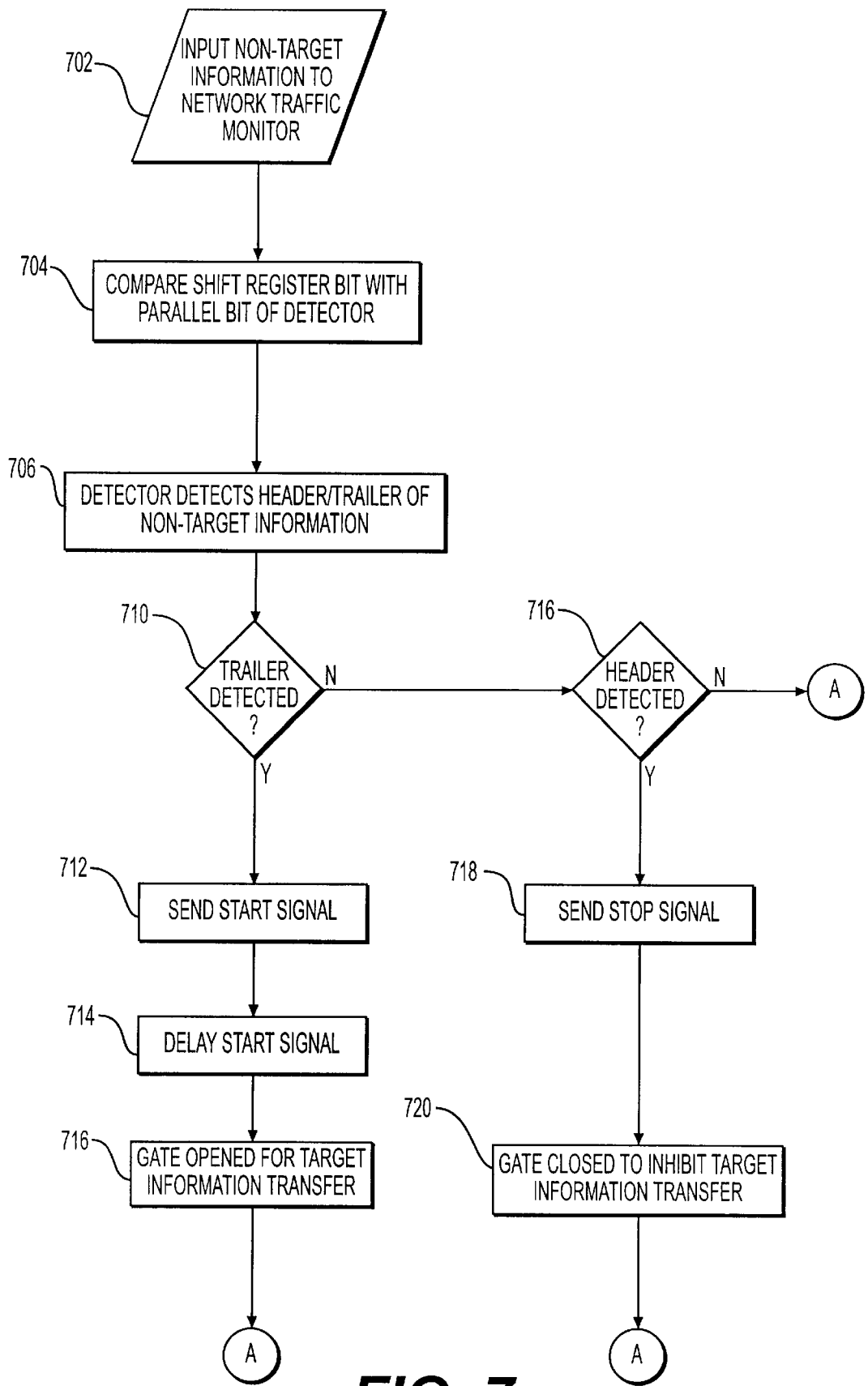
FIG. 7 is a flowchart illustrating the process of the network traffic monitor of FIG. 6.

FIGS. 6 and 7 show a schematic diagram and flow chart, respectively, of circuit used to minimize communication delay of non-target information according to one embodiment of special FTP service 132 of the present invention. Network traffic monitor 600 resident on master node 130 includes a shift register 610, a delay circuit 620, a detector 630, and a flow control 640. Network traffic monitor 600 monitors the network traffic on the transmission medium between user node 120 and master node 130.

First, non-target information packet is input to network traffic monitor 600 (step 702). Each bit of shift register 610 is then compared to a parallel bit of detector 630 (step 704) to detect an identification bit pattern, i.e. header or a trailer, of non-target information packets (step 706). If a trailer of an information packet is detected (step 710), detector 630 sends a start signal (step 712) and delay circuit 650 delays the transmittal of the start signal (step 714). The delayed start signal ensures that all non-target information has been transferred before initiating target information transfer. Delay circuit 650 then transmits the delayed start signal to flow control 640 to open the gate for transfer of target information packets (step 716).

On the other hand, if a header is detected (step 716), a stop signal is immediately sent to flow control 640 (step 718) to close the gate to inhibit the transfer of target information packets (step 720). Detector 630 actually sends the stop signal before the detected non-target information packet to assure that incoming non-target information does not collide with incoming target information packets. A buffer temporarily holds the non-target information in shift register 610 to ensure that target information has been transferred and that the transmission medium is available for transfer.

Figure 8:
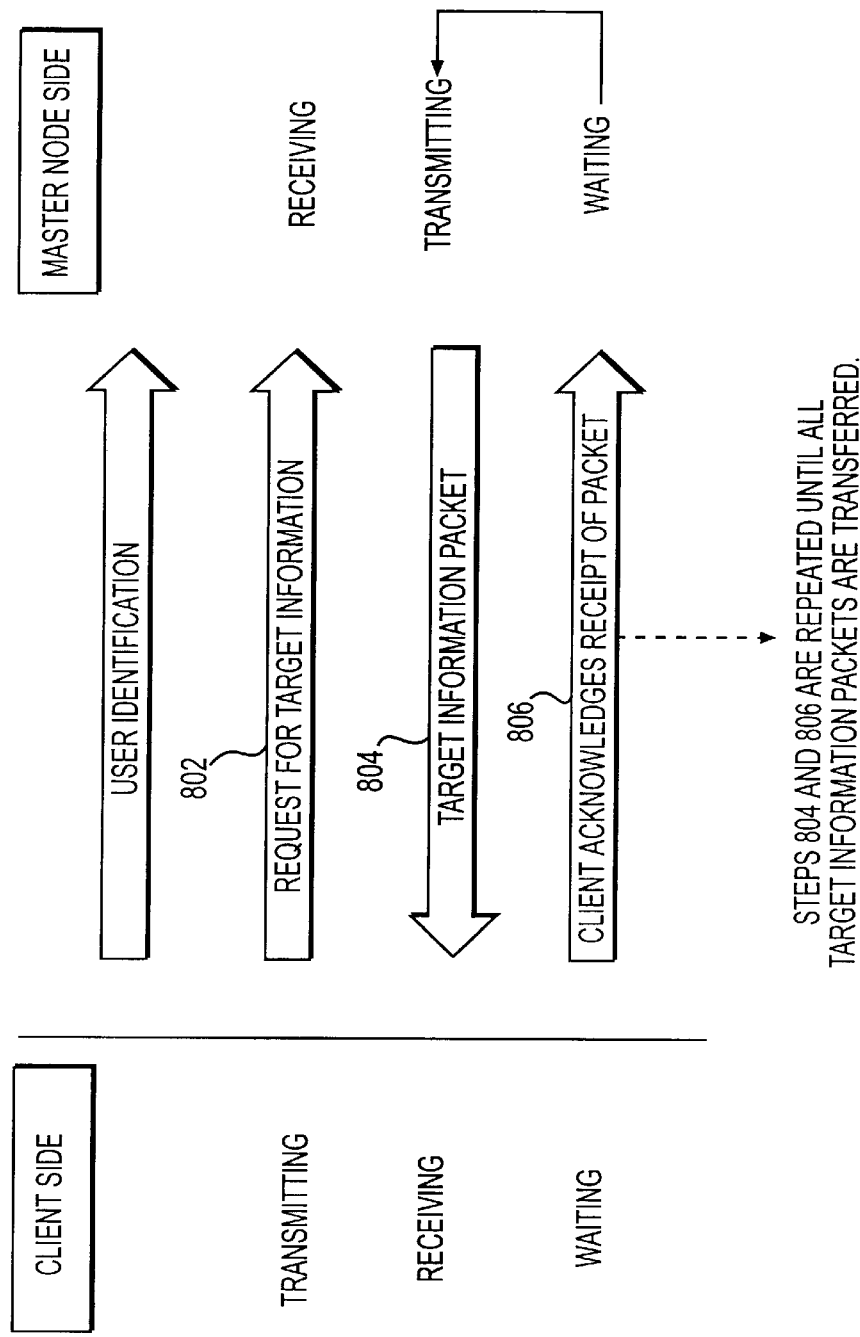
FIG. 8 is a schematic diagram of a special FTP service software according to another embodiment of the present invention.

FIG. 8 shows a schematic diagram of special FTP service software 132 for minimizing communication delay of non-target information according to another embodiment of special FTP service 132. In this embodiment, master node 130 regulates the transfer of target information packets depending on the amount of network traffic on the transmission medium.

As previously explained, Client 122 on user node 120 begins to request transfer of target information from master node 130 (step 802). Upon receiving the request for target information, master node 130 sends a packet of target information to Client 122 (step 804). Client 122 receives the target information packet and returns an acknowledgment of receipt to master node 130 for each packet received (step 806). Steps 804 and 806 repeat until a complete unit of target information is transferred to a temporary file at user node 120.

Master node 130 estimates the level of non-target information traffic by measuring the length of time between transmittal of a target information packet and receipt of acknowledgment from Client 122. If there is little network traffic, an acknowledgment is returned quickly. The higher the level of network traffic, the longer it takes to receive an acknowledgment. The master node 130 adjusts the amount of target information packets transmitted in accordance with the amount of time it takes to receive Client 122 acknowledgments. When the amount of time to receive acknowledgments reaches a predetermined maximum, however, master node 130 reduces the number of target information packets transferred. Therefore, transfer of target information packets has a minimal effect on non-target information traffic.

In ordinary TCP/IP, a maximum amount of data is transmitted and long trains of IP packets are queued on the receiving side. However, the present embodiment sends only a limited amount of target data to avoid interfering with the transfer of non-target information. Hence, the user does not notice any significant increase in transmission times for ordinary Internet traffic.

The process demonstrated in FIG. 8 may be modified to pace the transfer of target information packets dynamically by time-stamping the acknowledgments. This relieves master node 130 from waiting for actual acknowledgments of each packet.

Additionally, the process may also be modified to adjust the size of the send-window (number of bytes/packets sent before receiving acknowledgment) dynamically. Master node 130 may adjust the send-window size according to estimates made from tracing the amount of time it takes to receive acknowledgment. For example, a user node 120 with a 28.8 kbps modem can tolerate a much higher transfer rate than a user node 120 with a 12.4 kbps modem. Hence, the send-window can be adjusted accordingly.

Figure 5B:
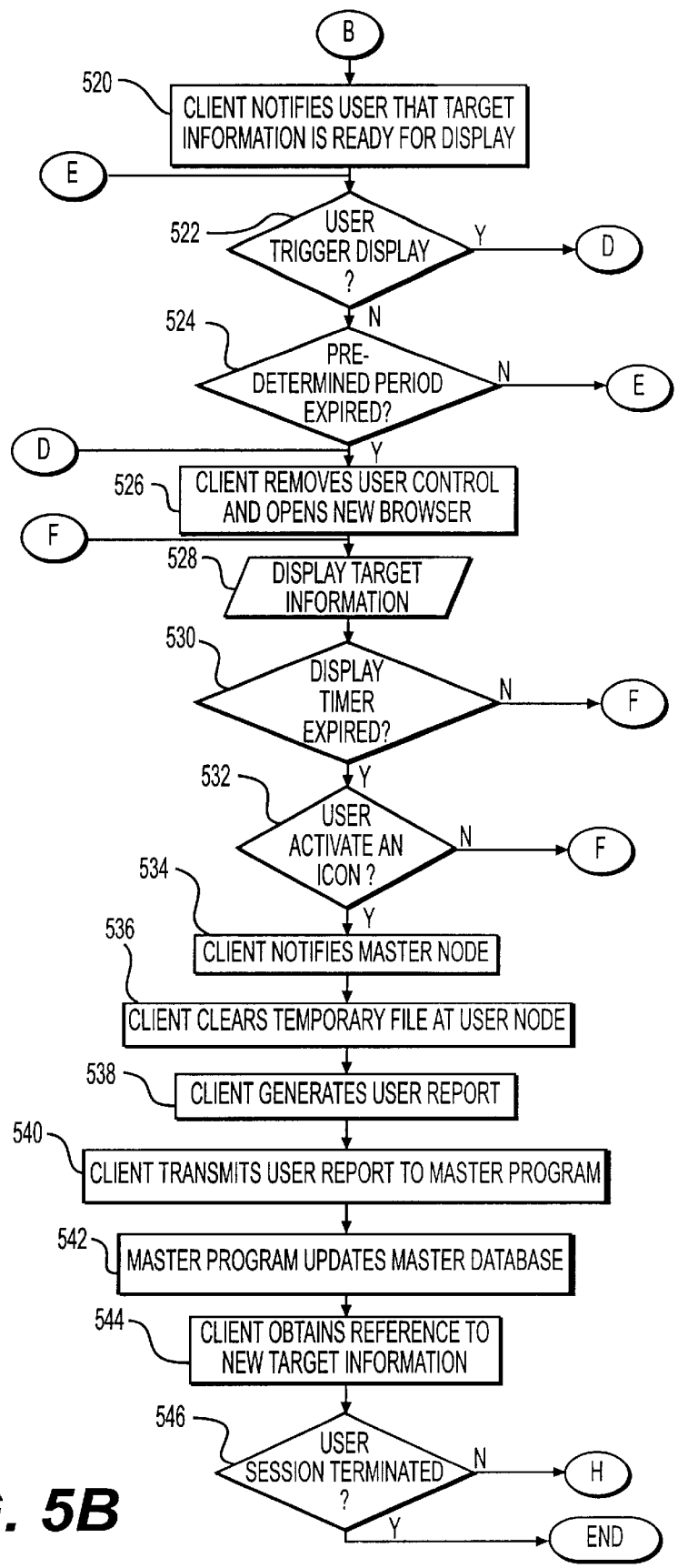

Referring to FIG. 5B, once the transfer of target information is complete, Client 122 notifies the user that the target information is ready for display by presenting a floating icon on the user's screen (step 520). Display of target information may be initiated by the user clicking the floating icon (step 522). Otherwise, the target information is displayed unconditionally after a predetermined period (step 524).

Before displaying the target information, however, Client 122 preferably removes the user's browser window control and disables normal keyboard and mouse input at user node 122 (step 526), thus ensuring that the user views the displayed information without interruption.

Once Client 122 detects that the floating icon has been selected or that the predetermined time period has expired, Client 122 opens a new browser window, for example a SPYGLASS API (Application Program Interface) compatible browser. The window is resized and the user is presented with a display of the target information for a predetermined time period (step 528).

Upon expiration of that time period, four icons are presented to the user on top portion of the target information display.

One is a DONE icon which notifies the Client 122 that the user has finished viewing the displayed information. Another icon is a MORE icon which enables the user to access more information about the displayed item. Activation of this icon will connect the user to a predetermined web page of the particular information provider of the displayed information. A SAVE icon saves the displayed information onto the user node 120 for later retrieval or viewing. A GET icon allows the user to retrieve a previously saved target information.

Client 122 sets the display timer to determine the duration of display of the target information. When the display timer expires (step 530), and the user activates one of the icons (step 520), Client 122 notifies the master node 130 (step 534) and deletes the target information from the temporary file at the user node 120 (step 536).

Client 122 also compiles and generates a user report containing display statistics, such as target information displayed, time and date of display, duration of display, optional request using the MORE icon, and accounting information (step 538). Client 122 eventually transmits the user report to master program 140 (step 540), and master program 140 updates master database 143 with the user report (step 542). Client 122 obtains another reference to new target information in accordance with the updated information (step 544).

The process discussed above of transferring and displaying target information continues until the conclusion of the user's session on computer network 100 (step 546). In the meantime, information providers 160 may access master program 140 to access accurate and up-to-date user responses detailing display statistics.

During the user's session on network 100, Client control 144 periodically sends a message to Client 122 in the background to command Client 122 to continue operating. If Client 122 does not receive the message within a predetermined time period, e.g. user has disconnected from network 100 or abnormal termination due to power failure, Client 122 cleans out the temporary file area of user node 120 and terminates its operation. Thus, Client 122 does not unnecessarily occupy temporary file area of user node 120 when the user is not connected to network 100.

CONCLUSION

This invention uses otherwise idle bandwidth by transmitting information specific to a user's profile while minimizing additional delay to the normal network traffic, and generate a report of user responses for information providers with accurate assessment of user demand. It does so by providing a new media channel, to assemble, distribute, present information, and collect user response.

The present invention is useful to non-commercial entities that desire to disseminate information to a target audience, for example during an election campaign. Moreover, commercial advertisers can now obtain accurate user responses in order to strategically market their products and services. This invention also provides a forum for commercial information providers to subsidize user's online service costs in exchange for a user periodically viewing the target information during the user's session on the network.

It will be apparent to those skilled in the art that various modifications and variations can be made in the computer network of the present invention and in construction of this computer network without departing from the scope or spirit of the invention.

Other embodiments of the invention will be apparent to those skilled in the art from consideration of the specification and practice of the invention disclosed herein. It is intended that the specification and examples be considered as exemplary only, with the true scope and spirit of the invention indicated by the following claims.

What is claimed is:

1. A computer network for connecting information providers and users through a network service provider that assigns network addresses to the users comprising:

a user node including
  means for sending a user id corresponding to a current user of the user node,
  means for receiving and displaying target information,
  means for receiving from the current user a request for certain user-selected information, and
  means for compiling and transmitting a user report identifying the displayed target information and user-selected information;

a master database containing user information, including user profile information and target information references;

a master node, coupled to the user node over a transmission medium capable of supporting communications between the master node and the user node, the master node including
  means for receiving the user id and the respective network address from the network service provider,
  means for monitoring the traffic on the transmission medium between the user node and the master node,
  means for transferring information to the user node minimizing additional communication delay between the master node and the user node; and a master program module, coupled to the master node and the master database, including
  means for receiving the user id and the respective network address from the master node,
  means for accessing from the master database user profile information corresponding to the user id,
  means for transmitting to the user node, through the master node, a reference to target information corresponding to the accessed user profile, and
  means for storing in the master database the user report from the user node.

2. The computer network of claim 1 wherein the means for transmitting a user report includes
  means for obtaining another reference to new target information.

3. The computer network of claim 1 wherein the means for displaying includes
  means for notifying the user when the target information is ready for display.

4. The computer network of claim 1 wherein the means for displaying the target information includes
  means for disabling user control of the display while displaying the target information.

5. The computer network of claim 1 wherein the means for receiving user request includes
  means for enabling the user to obtain further information related to the displayed target information.

6. The computer network of claim 1 wherein the means for receiving target information further includes
  means for receiving a target information reference for the current user, and
  means for requesting target information using the target information reference.

7. The computer network of claim 1 wherein the user information includes
  user id,
  reference to a segment list corresponding to the user profile, and
  reference to a target information list corresponding to the segment list, and
  wherein the master program module includes means for accessing the reference to the segment list, and the reference to the target information list.

8. The computer network of claim 1 wherein the transferring means include
  means for sending target information packets during times when information packets are not being sent.

9. The computer network of claim 1 wherein the storing means of the master program module includes
  means for updating the master database in response to the user report, and
  means for generating a report of updated user report to target information providers.

10. A computer network for connecting information providers and users through a network service provider that assigns network addresses to the users comprising:
  a user node including
    means for sending a user id corresponding to a current user of the user node,
    means for receiving and displaying target information, the displaying means including
      means for notifying the user when the target information is ready for display,
      means for monitoring a predetermined time period during which the user may trigger the display of the target information, and
      means for displaying the target information to the user upon expiration of the predetermined time period,
    means for receiving from the current user a request for certain user-selected information, and
    means for compiling and transmitting a user report identifying the displayed target information and user-selected information;
  a master database containing user information, including user profile information and target information references;
  a master node, coupled to the user node over a transmission medium capable of supporting communications between the master node and the user node, the master node including
    means for receiving the user id and the respective network address from the network service provider,
    means for monitoring the traffic on the transmission medium between the user node and the master node,
    means for transferring information to the user node minimizing additional communication delay between the master node and the user node; and
  a master program module, coupled to the master node and the master database, including
    means for receiving the user id and the respective network address from the master node,
    means for accessing from the master database user profile information corresponding to the user id,
    means for transmitting to the user node, through the master node, a reference to target information corresponding to the accessed user profile, and
    means for storing in the master database the user report from the user node.

11. A computer network for connecting information providers and users through a network service provider that assigns network addresses to the users comprising:
  a user node including
    means for sending a user id corresponding to a current user of the user node,
    means for receiving and displaying target information, the displaying means including
      means for receiving from the current user a request for certain user-selected information, and
      means for compiling and transmitting a user report identifying the displayed target information and user-selected information;
  a master database containing user information, including user profile information and target information references;
  a master node, coupled to the user node over a transmission medium capable of supporting communications between the master node and the user node, the master node including
    means for receiving the user id and the respective network address from the network service provider,
    means for monitoring the traffic on the transmission medium between the user node and the master node,
    means for transferring information to the user node minimizing additional communication delay between the master node and the user node, the transferring means including
      means for sending target information packets during times when information packets are not being sent, the sending means including
        a shift register to receive each bit of non-target information packets,
        a detector to detect an identification bit pattern of non-target information packets in the shift register,
        a flow controller to control transfer of target information packets by opening and closing a gate in response to the detected identification bit pattern, and
        means for delaying a start signal initiating transfer of target information packets in response to a detected trailer bit until transfer of non-target information packet is complete; and
  a master program module, coupled to the master node and the master database, including
    means for receiving the user id and the respective network address from the master node,
    means for accessing from the master database user profile information corresponding to the user id,
    means for transmitting to the user node, through the master node, a reference to target information corresponding to the accessed user profile, and
    means for storing in the master database the user report from the user node.

12. A computer network for connecting information providers and users through a network service provider that assigns network addresses to the users comprising:
  a user node including
    means for sending a user id corresponding to a current user of the user node,
    means for receiving and displaying target information, the displaying means including
      means for receiving from the current user a request for certain user-selected information, and
      means for compiling and transmitting a user report identifying the displayed target information and user-selected information;
  a master database containing user information, including user profile information and target information references;
  a master node, coupled to the user node over a transmission medium capable of supporting communications between the master node and the user node, the master node including
    means for receiving the user id and the respective network address from the network service provider,
    means for monitoring the traffic on the transmission medium between the user node and the master node,
    means for transferring information to the user node minimizing additional communication delay between the master node and the user node, the transferring means including means for sending target information packets during
times when information packets are not being sent
the sending means including
means for monitoring length of time necessary
for transfer of each target information packet,
and
means for adjusting the rate of target information
transfer in response to the monitored transfer
time to minimize additional delay between the
master node and the user node; and
a master program module, coupled to the master node and
the master database, including
means for receiving the user id and the respective
network address from the master node,
means for accessing from the master database user
profile information corresponding to the user id,
means for transmitting to the user node, through the
master node, a reference to target information corresponding to the accessed user profile, and
means for storing in the master database the user report
from the user node.

13. A computer network for connecting information providers and users through a network service provider that assigns network addresses to the users comprising:
a user node including
means for sending a user id corresponding to a current
user of the user node,
means for receiving and displaying target information,
the displaying means including
means for receiving from the current user a request
for certain user-selected information, and
means for compiling and transmitting a user report
identifying the displayed target information and
user-selected information;
a master database containing user information, including
user profile information and target information references;
a master node, coupled to the user node over a transmission medium capable of supporting communications
between the master node and the user node, the master
node including
means for receiving the user id and the respective
network address from the network service provider,
means for monitoring the traffic on the transmission
medium between the user node and the master node,
means for transferring information to the user node
minimizing additional communication delay
between the master node and the user node, the
transferring means including
means for sending target information packets during
times when information packets are not being sent
the sending means including
means for monitoring length of time necessary
for transfer of each target information packet,
the monitoring means including
means for estimating amount of network traffic by
measuring length of time between transmittal of
target information packet by the master node and
a message of receipt by the user node, and
means for adjusting the rate of target information
transfer in response to the monitored transfer
time to minimize additional delay between the
master node and the user node; and
a master program module, coupled to the master node and
the master database, including
means for receiving the user id and the respective
network address from the master node,
means for accessing from the master database user
profile information corresponding to the user id,
means for transmitting to the user node, through the
master node, a reference to target information corresponding to the accessed user profile, and
means for storing in the master database the user report
from the user node.

14. A computer network for connecting information providers and users through a network service provider that assigns network addresses to the users comprising:
a user node including
means for sending a user id corresponding to a current
user of the user node,
means for receiving and displaying target information,
the displaying means including
means for receiving from the current user a request
for certain user-selected information, and
means for compiling and transmitting a user report
identifying the displayed target information and
user-selected information;
a master database containing user information, including
user profile information and target information references;
a master node, coupled to the user node over a transmission medium capable of supporting communications
between the master node and the user node, the master
node including
means for receiving the user id and the respective
network address from the network service provider,
means for monitoring the traffic on the transmission
medium between the user node and the master node,
means for transferring information to the user node
minimizing additional communication delay
between the master node and the user node, the
transferring means including
means for sending target information packets during
times when information packets are not being
sent, the sending means including
means for monitoring length of time necessary
for transfer of each target information packet,
the monitoring means including
means for recording when each target information
packet is transmitted by the master node,
means for receiving acknowledgment of receipt from
the user node, and
means for estimating amount of network traffic by
determining length of time between the transmittal
and the receipt, and
means for adjusting the rate of target information
transfer in response to the monitored transfer
time to minimize additional delay between the
master node and the user node; and
a master program module, coupled to the master node and
the master database, including
means for receiving the user id and the respective
network address from the master node,
means for accessing from the master database user
profile information corresponding to the user id,
means for transmitting to the user node, through the
master node, a reference to target information corresponding to the accessed user profile, and
means for storing in the master database the user report
from the user node.

15. A network traffic monitor for transferring target information packets while minimizing additional communication delay between a user node and a master node comprising:
a shift register to store each bit of non-target information
packets;

a detector to detect an identification bit pattern of non-target information packets in the shift register;

a flow controller to control a transfer gate in response to the detected identification bit pattern; and means for delaying a start signal initiating transfer of target information packets in response to a detected identification bit pattern until transfer of non-target information packet is complete.

16. The network traffic monitor of claim 15 wherein the identification bit pattern of non-target information is a header bit pattern.

17. The network traffic monitor of claim 15 wherein the identification bit pattern of non-target information is a trailer bit pattern.

18. A network traffic controller for transferring target information packets while minimizing additional communication delay between a user node and a master node comprising:

means for monitoring length of time necessary for transfer of each target information packet; and means for adjusting the rate of target information transfer in response to the monitored transfer time.

19. A network traffic controller of claim 18 wherein the monitoring means include means for estimating amount of network traffic by measuring length of time between transmittal of target information packet by the master node and receipt by the user node.

20. The network traffic controller of claim 18 wherein the monitoring means include means for recording when each target information packet is transmitted by the master node, means for receiving acknowledgement of receipt from the user node, and means for estimating amount of network traffic by determining length of time between the transmittal and the acknowledgement of receipt.

21. A method for connecting information providers and users comprising the steps of:

sending from a user node to a network service provider a user id corresponding to a current user of the user node;

sending from the network service provider to a master program module the user id and a respective network address;

accessing, by the master program module, user profile information corresponding to the user id;

transmitting from the master program module to the user node a reference to target information corresponding to the accessed user profile;

receiving the reference to the target information at the user node;

requesting a transfer of target information from a master node to the user node using the reference;

transferring the requested target information from the master node to the user node minimizing additional communication delay between the master node and the user node;

displaying the transferred target information;

receiving from the current user a request for certain user-selected information;

compiling and transmitting a user report identifying the displayed target information and user-selected information; and storing the user report from the user node.

22. The method of claim 21 wherein the step of transmitting a user report includes the step of obtaining another reference to new target information.

23. The method of claim 21 wherein the step of displaying the transferred target information includes the step of notifying the registered user when the target information is ready for display.

24. The method of claim 21 wherein the step of displaying the target information upon expiration of the predetermined time period includes the step of disabling user control of the display while displaying the target information.

25. The method of claim 21 wherein the step of transferring the requested target information includes the step of sending target information packets during times when information packets are not being sent.

26. The method of claim 21 wherein the step of storing the user report includes the steps of updating a master database in response to the user report, and generating a report of updated user report to target information providers.

27. A method for connecting information providers and users comprising the steps of:

sending from a user node to a network service provider a user id corresponding to a current user of the user node;

sending from the network service provider to a master program module the user id and a respective network address;

accessing, by the master program module, user profile information corresponding to the user id;

transmitting from the master program module to the user node a reference to target information corresponding to the accessed user profile;

receiving the reference to the target information at the user node;

requesting a transfer of target information from a master node to the user node using the reference;

transferring the requested target information from the master node to the user node minimizing additional communication delay between the master node and the user node;

displaying the transferred target information, the displaying step further including the steps of timing a predetermined time period during which the user may trigger the display of the target information, and displaying the target information to the user upon expiration of the predetermined time period;

receiving from the current user a request for certain user-selected information;

compiling and transmitting a user report identifying the displayed target information and user-selected information; and storing the user report from the user node.

28. A method for connecting information providers and users comprising the steps of:

sending from a user node to a network service provider a user id corresponding to a current user of the user node;

sending from the network service provider to a master program module the user id and a respective network address;

accessing, by the master program module, user profile information corresponding to the user id;

transmitting from the master program module to the user node a reference to target information corresponding to the accessed user profile;

receiving the reference to the target information at the user node;

requesting a transfer of target information from a master node to the user node using the reference;

transferring the requested target information from the master node to the user node minimizing additional communication delay between the master node and the user node, the transferring step including the step of sending target information packets during times when information packets are not being sent, the sending step further including the steps of storing each bit of non-target information packets in a shift register, detecting an identification bit pattern of non-target information packets in a shift register, controlling a transfer gate of the shift register in response to the detected identification bit pattern, and delaying a start signal initiating transfer of target information packets in response to the detected identification bit pattern until transfer of non-target information packet is complete;

displaying the transferred target information;

receiving from the current user a request for certain user-selected information;

compiling and transmitting a user report identifying the displayed target information and user-selected information; and storing the user report from the user node.

29. A method for connecting information providers and users comprising the steps of:

sending from a user node to a network service provider a user id corresponding to a current user of the user node;

sending from the network service provider to a master program module the user id and a respective network address;

accessing, by the master program module, user profile information corresponding to the user id;

transmitting from the master program module to the user node a reference to target information corresponding to the accessed user profile;

receiving the reference to the target information at the user node;

requesting a transfer of target information from a master node to the user node using the reference;

transferring the requested target information from the master node to the user node minimizing additional communication delay between the master node and the user node, the transferring step including the step of sending target information packets during times when information packets are not being sent, the sending step further including the steps of storing each bit of non-target information packets in a shift register, detecting an identification bit pattern of non-target information packets in a shift register, wherein the identification bit pattern of non-target information packets is a header bit pattern, controlling a transfer gate of the shift register in response to the detected identification bit pattern, and delaying a start signal initiating transfer of target information packets in response to the detected identification bit pattern until transfer of non-target information packet is complete;

displaying the transferred target information;

receiving from the current user a request for certain user-selected information;

compiling and transmitting a user report identifying the displayed target information and user-selected information; and storing the user report from the user node.

30. A method for connecting information providers and users comprising the steps of:

sending from a user node to a network service provider a user id corresponding to a current user of the user node;

sending from the network service provider to a master program module the user id and a respective network address;

accessing, by the master program module, user profile information corresponding to the user id;

transmitting from the master program module to the user node a reference to target information corresponding to the accessed user profile;

receiving the reference to the target information at the user node;

requesting a transfer of target information from a master node to the user node using the reference;

transferring the requested target information from the master node to the user node minimizing additional communication delay between the master node and the user node, the transferring step including the step of sending target information packets during times when information packets are not being sent, the sending step further including the steps of storing each bit of non-target information packets in a shift register, detecting an identification bit pattern of non-target information packets in a shift register, wherein the identification bit pattern of non-target information packets is a trailer bit pattern, controlling a transfer gate of the shift register in response to the detected identification bit pattern, and delaying a start signal initiating transfer of target information packets in response to the detected identification bit pattern until transfer of non-target information packet is complete;

displaying the transferred target information;

receiving from the current user a request for certain user-selected information;

compiling and transmitting a user report identifying the displayed target information and user-selected information; and storing the user report from the user node.

31. A method for connecting information providers and users comprising the steps of:

sending from a user node to a network service provider a user id corresponding to a current user of the user node;

sending from the network service provider to a master program module the user id and a respective network address;

accessing, by the master program module, user profile information corresponding to the user id;

transmitting from the master program module to the user node a reference to target information corresponding to the accessed user profile;

receiving the reference to the target information at the user node;

requesting a transfer of target information from a master node to the user node using the reference;

transferring the requested target information from the master node to the user node minimizing additional communication delay between the master node and the user node, the transferring step including the step of sending target information packets during times when information packets are not being sent, the sending step further including the steps of monitoring length of time necessary to transfer each target information packet, and adjusting the rate of target information transfer in response to the monitored transfer time;

displaying the transferred target information;

receiving from the current user a request for certain user-selected information;

compiling and transmitting a user report identifying the displayed target information and user-selected information; and storing the user report from the user node.

32. A method for connecting information providers and users comprising the steps of:

sending from a user node to a network service provider a user id corresponding to a current user of the user node;

sending from the network service provider to a master program module the user id and a respective network address;

accessing, by the master program module, user profile information corresponding to the user id;

transmitting from the master program module to the user node a reference to target information corresponding to the accessed user profile;

receiving the reference to the target information at the user node;

requesting a transfer of target information from a master node to the user node using the reference;

transferring the requested target information from the master node to the user node minimizing additional communication delay between the master node and the user node, the transferring step including the step of sending target information packets during times when information packets are not being sent, the sending step further including the steps of monitoring length of time necessary to transfer each target information packet, the monitoring step including the step of estimating amount of network traffic by measuring length of time between transmittal of target information packet by the master node and a message of receipt by the user node; and adjusting the rate of target information transfer in response to the monitored transfer time;

displaying the transferred target information;

receiving from the current user a request for certain user-selected information;

compiling and transmitting a user report identifying the displayed target information and user-selected information; and storing the user report from the user node.

33. A method for connecting information providers and users comprising the steps of:

sending from a user node to a network service provider a user id corresponding to a current user of the user node;

sending from the network service provider to a master program module the user id and a respective network address;

accessing, by the master program module, user profile information corresponding to the user id;

transmitting from the master program module to the user node a reference to target information corresponding to the accessed user profile;

receiving the reference to the target information at the user node;

requesting a transfer of target information from a master node to the user node using the reference;

transferring the requested target information from the master node to the user node minimizing additional communication delay between the master node and the user node, the transferring step including the step of sending target information packets during times when information packets are not being sent, the sending step further including the steps of monitoring length of time necessary to transfer each target information packet, the monitoring step including the steps of recording when each target information packet is transmitted by the master node, receiving a message form the user node acknowledging receipt of the packet, and estimating amount of network traffic by determining length of time between the transmittal and the message acknowledging receipt, and adjusting the rate of target information transfer in response to the monitored transfer time;

displaying the transferred target information;

receiving from the current user a request for certain user-selected information;

compiling and transmitting a user report identifying the displayed target information and user-selected information; and storing the user report from the user node.

34. A method of monitoring network traffic for transferring target information packets while minimizing additional communication delay between a user node and a master node comprising the steps of:

storing each bit of non-target information packets in a shift register;

detecting an identification bit pattern of non-target information packets in a shift register;

controlling a transfer gate in response to the detected identification bit pattern; and delaying a start signal initiating transfer of target information packets in response to the detected identification bit pattern until transfer of non-target information packet is complete.

35. The method of claim 34 wherein the identification bit pattern of non-target information packets is a header bit pattern.

36. The method of claim 34 wherein the identification bit pattern of non-target information packets is a trailer bit pattern.

37. A method of transferring target information packets while minimizing additional communication delay between a user node and a master node comprising the steps of:

monitoring length of time necessary for transfer of each target information packet; and adjusting the rate of target information transfer in response to the monitored transfer time.

38. A method of claim 37 wherein the monitoring step includes
   estimating amount of network traffic by measuring length of time between transmittal of target information packet by the master node and a message of receipt by the user node.

39. The method of claim 37 wherein the monitoring step includes
   recording when each target information packet is transmitted by the master node,
   receiving a message from the user node acknowledging receipt of the packet, and
   estimating amount of network traffic by determining length of time between the transmittal and the message receipt.

40. A master program module coupled to a master node and a master database for connecting information providers and user nodes for a computer network comprising:
   means for registering a first-time user of the computer network;
   means for receiving, through the master node, a user id and respective network address corresponding to a current user of the user node;
   means for accessing from the master database user profile information corresponding to the user id;
   means for transmitting to the user node, through the master node, a reference to target information corresponding to the accessed user profile; and
   means for storing a user report from the user node.

41. A method for connecting information providers and user nodes coupled to a master node and a master database comprising the steps of:
   receiving through the master node a user id corresponding to a current user of the user node;
   accessing from the master database user profile information corresponding to the user id and respective network address;
   transmitting to the user node, through the master node, a reference to target information corresponding to the accessed user profile; and
   storing a user report from the user node.

42. A user node for connecting information providers and users coupled with a master node, a master database, and a master program comprising:
   means for sending a user id corresponding to a current user of the user node;
   means for requesting a transfer of target information from the master node;
   means for receiving the requested target information from the master node, wherein the master node transfers the requested target information while minimizing additional communication delay between the master node and the user node;
   means for displaying the received target information;
   means for receiving from the current user a request for certain user-selected information; and
   means for compiling and transmitting a user report identifying the displayed target information and user-selected information.

43. The user node of claim 42 wherein the means for transmitting a user report includes
   means for obtaining another reference to new target information.

44. The user node of claim 42 wherein the means for displaying includes
   means for notifying the user when the target information is ready for display.

45. The user node of claim 42 wherein the means for displaying includes
   means for enabling the user to obtain further information related to the displayed target information.

46. The user node of claim 42 wherein the means for displaying includes
   means for receiving a target information reference for the current user, and
   means for requesting target information using the target information reference.

47. A user node for connecting information providers and users coupled with a master node, a master database, and a master program comprising:
   means for sending a user id corresponding to a current user of the user node;
   means for requesting a transfer of target information from the master node;
   means for receiving the requested target information from the master node without causing additional communication delay between the master node and the user node;
   means for displaying the received target information, the displaying means including
      means for timing a predetermined time period during which the user may trigger the display of the target information, and
      means for displaying the target information to the user upon expiration of the predetermined time period;
   means for receiving from the current user a request for certain user-selected information; and
   means for compiling and transmitting a user report identifying the displayed target information and user-selected information.

48. A user node for connecting information providers and users coupled with a master node, a master database, and a master program comprising:
   means for sending a user id corresponding to a current user of the user node;
   means for requesting a transfer of target information from the master node;
   means for receiving the requested target information from the master node without causing additional communication delay between the master node and the user node;
   means for displaying the received target information, the displaying means including
      means for timing a predetermined time period during which the user may trigger the display of the target information, and
      means for displaying the target information to the user upon expiration of the predetermined time period, the displaying means further including
         means for disabling user control of the display while displaying the target information;
   means for receiving from the current user a request for certain user-selected information; and
   means for compiling and transmitting a user report identifying the displayed target information and user-selected information.

49. A method for connecting information providers and users coupled with a master node, a master database, and a master program module, the method comprising the steps of:

sending from a user node to a master program module a user id and respective network address corresponding to a current user of the user node;

transmitting from the master program module to the user node a reference to target information corresponding to the accessed user profile;

receiving the reference to the target information at the user node;

requesting a transfer of target information from a master node to the user node using the reference;

receiving the requested target information from the master node, wherein the master node transfer the requested target information while minimizing additional communication delay between the master node and the user node;

displaying the requested target information;

receiving from the current user a request for certain user-selected information; and compiling and transmitting a user report identifying the displayed target information and user-selected information.

50. The method of claim 49 wherein the step of transmitting a user report includes the step of obtaining another reference to new target information.

51. The method of claim 49 wherein the step of displaying the transferred target information includes the step of notifying the user when the target information is ready for display.

52. The method of claim 49 wherein the step of displaying includes enabling the user to obtain further information related to the displayed target information.

53. The method of claim 49 wherein the step of displaying includes receiving a target information reference for the current user, and requesting target information using the target information reference.

54. A method for connecting information providers and users coupled with a master node, a master database, and a master program module, the method comprising the steps of:

sending from a user node to a master program module a user id and respective network address corresponding to a current user of the user node;

transmitting from the master program module to the user node a reference to target information corresponding to the accessed user profile;

receiving the reference to the target information at the user node;

requesting a transfer of target information from a master node to the user node using the reference;

receiving the requested target information from the master node without causing additional communication delay between the master node and the user node;

displaying the requested target information, the displaying step including the steps of timing a predetermined time period during which the user may trigger the display of the target information, and displaying the target information to the user upon expiration of the predetermined time period;

receiving from the current user a request for certain user-selected information; and compiling and transmitting a user report identifying the displayed target information and user-selected information.

55. A method for connecting information providers and users coupled with a master node, a master database, and a master program module, the method comprising the steps of:

sending from a user node to a master program module a user id and respective network address corresponding to a current user of the user node;

transmitting from the master program module to the user node a reference to target information corresponding to the accessed user profile;

receiving the reference to the target information at the user node;

requesting a transfer of target information from a master node to the user node using the reference;

receiving the requested target information from the master node without causing additional communication delay between the master node and the user node;

displaying the requested target information, the displaying step including the steps of timing a predetermined time period during which the user may trigger the display of the target information, and displaying the target information onto the user's screen upon expiration of the predetermined time period, the displaying step further including the substep of disabling user control of the display while displaying the target information;

receiving from the current user a request for certain user-selected information; and compiling and transmitting a user report identifying the displayed target information and user-selected information.

* * * * *